July 16, 1940.  A. R. BIEDESS  2,208,205
MUCKING MACHINE
Filed April 4, 1938   2 Sheets-Sheet 1
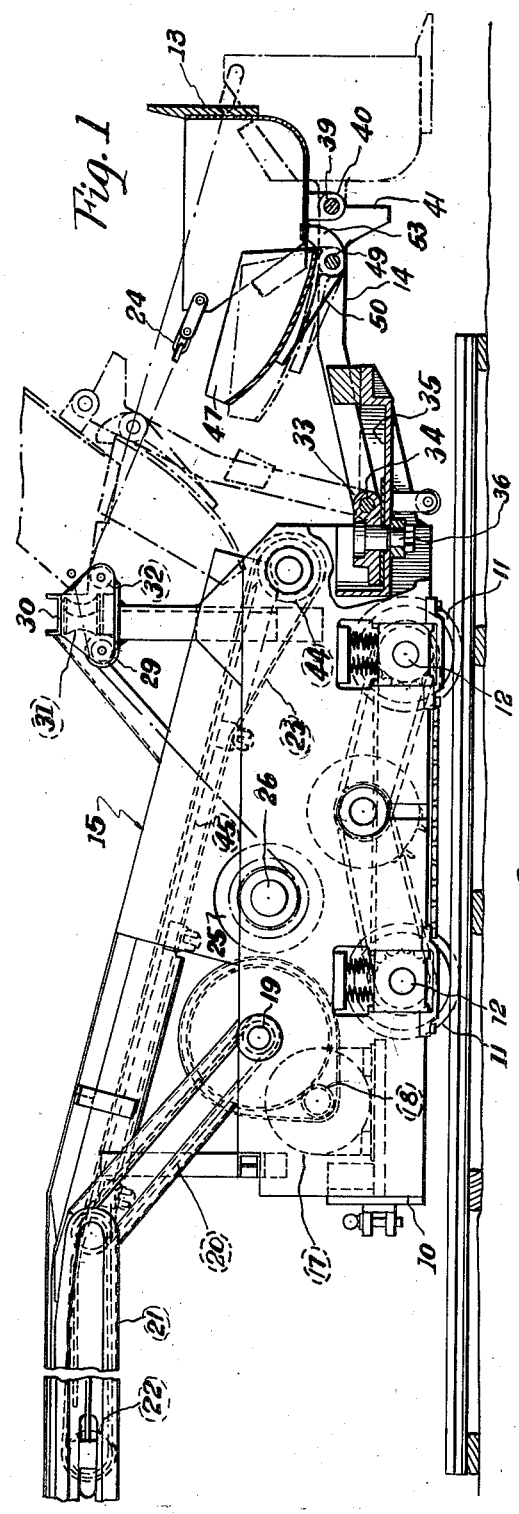
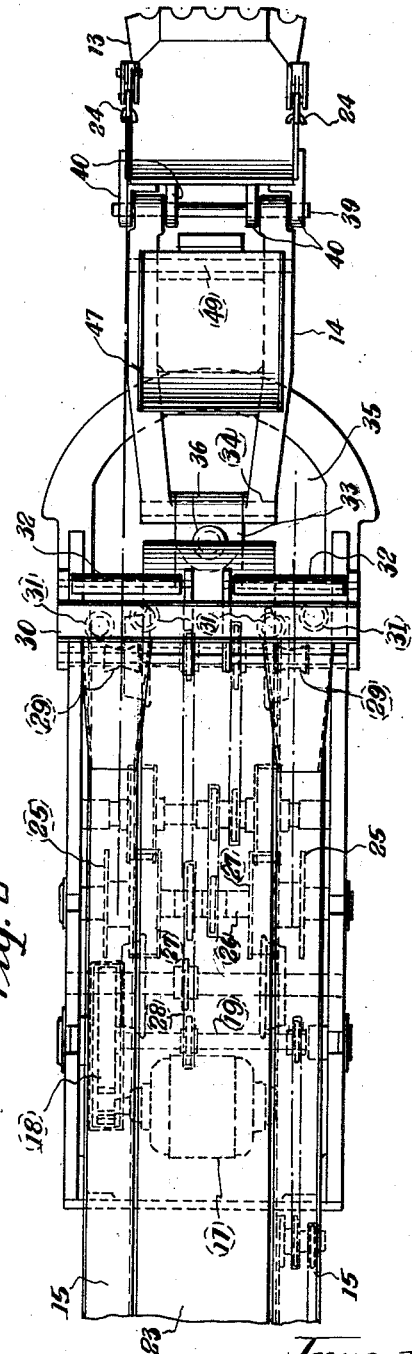
Inventor
Anthony R. Biedess
Clarence J. Poole
Attorney July 16, 1940.  A. R. BIEDESS  2,208,205
MUCKING MACHINE
Filed April 4, 1938    2 Sheets-Sheet 2
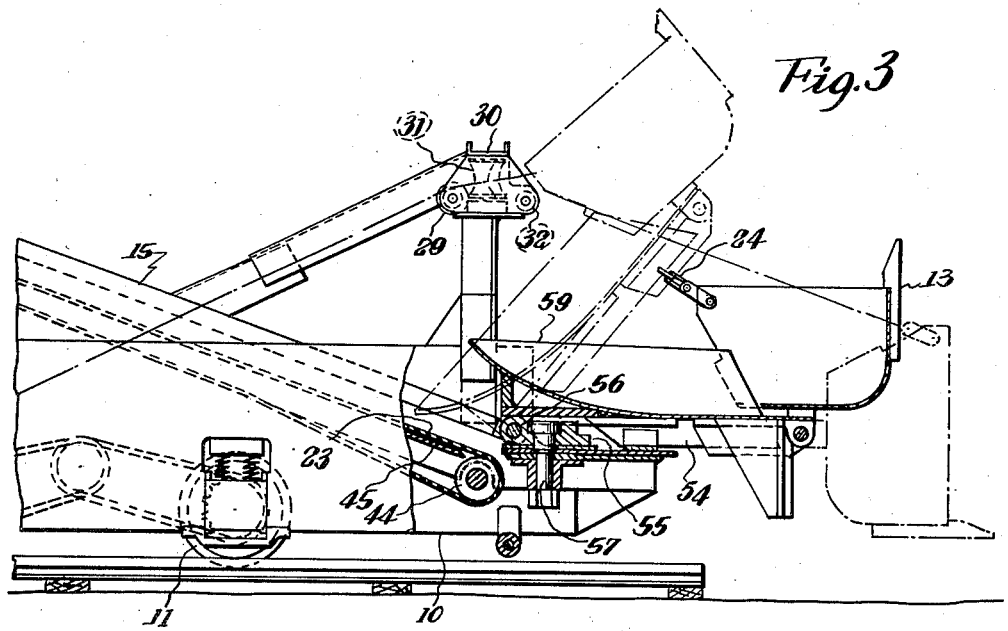
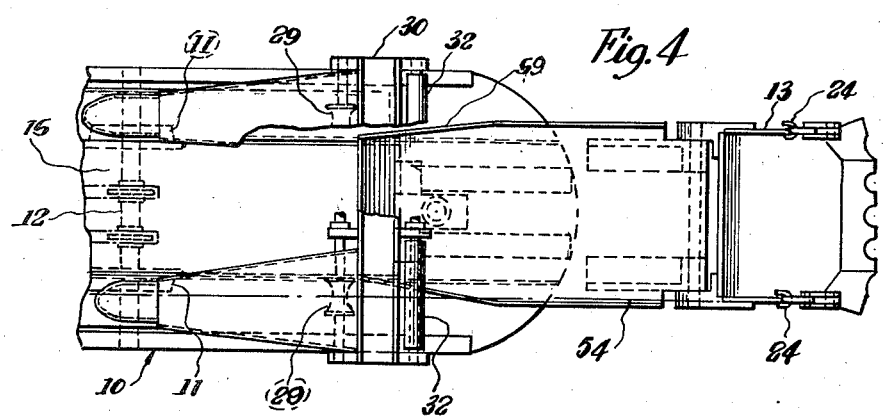
Inventor
Anthony R. Biedess
Clarence J. Poole
Attorney Patented July 16, 1940

2,208,205

UNITED STATES PATENT OFFICE 2,208,205

MUCKING MACHINE

Anthony R. Biedess, Chicago, Ill., assignor to Goodman Manufacturing Company, Chicago, Ill., a corporation of Illinois Application April 4, 1938, Serial No. 199,781

15 Claims. (Cl. 214—90)

This invention relates to improvements in mucking machines adapted for use in shoveling muck or rock in tunnels and mines.

Mucking machines of the type disclosed in Patent No. 1,514,008, which issued to J. P. Mosier on November 4, 1924, have heretofore been extensively used in tunnels or mines for shoveling rock or muck and delivering it to cars. Such machines have served as efficient shoveling machines but have had the disadvantage that the heavy rock drops directly from the scoop onto the conveyer belt with considerable force and at substantially right angles with respect to the direction of travel of the conveyer. This causes great damage to the belt and decreases the life thereof to the extent that belt replacement is one of the greatest factors in the upkeep of the machine.

Among the objects of my invention is to obviate this difficulty by so arranging the boom supporting the scoop, as to retard the speed of discharge of the material from the scoop onto the conveyer.

Another object of my invention is to decrease the shock with which material is discharged onto the conveyer by providing a chute on the boom for delivering material from the scoop to the conveyer which has a discharge end which diverges from the boom in such a manner as to deliver material onto the conveyer in the direction of travel of the conveyer and at a relatively flat angle with respect thereto.

Still another object of my invention is to provide a shorter and more compact machine than formerly by so arranging the boom that its rear end may be beneath the receiving end of the conveyer so the scoop and boom may serve to lift the material and discharge it directly onto the conveyer.

Other objects of my invention will appear from time to time as the accompanying specification proceeds.

My invention may be more clearly understood with reference to the accompanying drawings wherein:

Figure 1 is a view in side elevation of a mucking machine constructed in accordance with my invention with certain parts broken away and shown in substantially longitudinal section;

Figure 2 is a plan view of the device shown in Figure 1;

Figure 3 is a fragmentary view in side elevation of a mucking machine, illustrating a modified form of my invention; and Figure 4 is a fragmentary plan view of the device shown in Figure 3.

Referring now in particular to the drawings, the embodiment of my invention illustrated therein is constructed along lines somewhat similar to those shown in the aforementioned Patent No. 1,514,008 issued to J. P. Mosier, and includes a truck or main frame 10 mounted on track wheels 11, 11 and axles 12, 12. Said main frame forms a support for a scoop 13 which is supported in advance thereof on the end of a boom 14. Said scoop and boom are so arranged and mounted on said main frame that said scoop may gather material in front of and to each side of the track by movement of the truck along the track.

The conveyer 15 is herein shown as being a belt conveyer of an ordinary construction and includes a belt 23 which is trained around a drive roller 22 at the rear end of the conveyer frame and around an idler roller 44 mounted at the forward end of the frame 10 directly above the rear end of the boom 14. Said belt extends along a bottom plate 45 connecting the sides of the conveyer frame together, which bottom plate extends along the main frame 10 in an upwardly inclined direction to a position herein shown as being adjacent the rear end of said frame. The conveyer frame and said bottom plate then flatten out and overhang the rear of the frame 10 to permit the discharge of material into cars or the like.

The moving parts of the machine are driven from a motor 17 mounted adjacent the rear end of the main frame 10. Said motor may be of any suitable type but is herein shown as being an electric motor of an ordinary construction.

The conveyer 15 is driven from the motor 17 through a spur gear reduction, generally indicated by reference character 18, a transverse shaft 19, a chain and sprocket drive, generally indicated by reference character 20, and another chain and sprocket drive generally indicated by reference character 21. Said last mentioned chain and sprocket drive serves to drive the pulley 22 disposed at the rear end of said conveyer and having the belt 23 of said conveyer trained therearound.

The track wheels 11 are driven from the shaft 19 in either a forward or reverse direction without reversal of the motor in a manner similar to that shown in the aforementioned Mosier Patent No. 1,514,008 and not herein shown or described in detail since it is no portion of my present invention.

The scoop 13 is elevated to a discharge position or swung from side to side by a pair of chains 24, 24 connected to opposite sides of the upper corners thereof. Said chains are adapted to be wound on or paid off of a pair of winding drums 25, 25 mounted on a transversely extending shaft 26. Planetary geared reduction devices 27, 27 are mounted on said last mentioned shaft and form a means for independently driving either of said winding drums from said shaft. Said shaft is driven from the shaft 19 by means of a chain and sprocket drive generally indicated by reference character 28. Said planetaries are of a construction similar to that disclosed in the aforementioned Mosier patent and are no part of my present invention so will not herein be shown or described in detail.

Each flexible chain 24 is trained from one of the winding drums 25, upwardly therefrom and over a horizontally journaled guide roller 29 mounted on an upright support member 30. Each of said chains then passes between spaced apart vertically journaled guide rollers 31, 31, over a horizontally journaled guide roller 32, and downwardly to the scoop 13. When both of the planetaries 27, 27 have driving connection with the winding drums 25, 25, the boom 14 and scoop 13 will be pivoted in an upward direction to the discharge position shown by broken lines in Figure 1. When it is desired to swing the scoop to one side or the other of the track, power is applied to the winding drum on the side it is desired to swing.

With reference now to the mounting of the boom 14 on the main frame 10 and the novel arrangement whereby the machine may be of a shorter and more compact form than formerly, said boom is transversely pivoted on a hinge member 33 on a horizontal transversely disposed hinge pin 34. Said hinge member is disposed beneath the uppermost boundaries of the track wheels 11, 11 closely adjacent, but forward of, said track wheels and directly beneath the receiving end of the conveyer 15 and is mounted in a forwardly projecting recessed portion 35 of the frame 10 on a vertically disposed pivotal pin 36, which is disposed rearwardly of the pin 34. The forward end of said projecting portion is of an arcuate form and is adapted to form a support on which said boom may slide when being adjusted to gather from one side of the track or the other, and also forms a stop and support for said boom during the gathering operation.

The scoop 13 is pivotally connected to the forward end of the boom 14 by a transverse shaft 39 extending through opposite sides of the outer end of said boom and through brackets 40, 40 projecting rearwardly from said scoop. A member 41 depends from the forward end of said boom and is adapted to abut said scoop during the gathering operation to form a solid abutment for said scoop so that movement of the machine along the track will force said scoop into the material it is desired to load.

Referring now in particular to the novel form and arrangement of discharge means for delivering material from the scoop 13 to the conveyer 15 in the direction of travel of the conveyer and at a relatively flat angle with respect thereto, a chute 47 is mounted on and extends along the boom 14. As shown in Figures 1 and 2, said chute is transversely pivoted on said boom on a transverse shaft 49 mounted between the sides of said boom and extending through a bracket 50 depending from said chute.

A controlling member 53 is provided to pivot the discharge end of said chute in an upward direction and prevent the spilling of material therefrom during upward pivotal movement of said scoop and boom and thus permit said chute to elevate the material discharged from said scoop onto the conveyer 15. Said controlling member extends forwardly from said bracket and, as herein shown, is formed integral therewith and is adapted to be engaged by the scoop 13 when pivoted about its axis of pivotal connection to the boom 14 to the position shown by solid lines in Figure 1.

It will be seen from the foregoing that when the scoop 13 has been loaded with material and is pivoted in an upward direction by the chains 24, 24, that the scoop 13 will pivot the delivery end of the chute 47 in an upward direction to prevent spillage of any material from said chute which is discharged therefrom from said scoop during movement of said scoop and boom to a discharge position.

It will further be seen that during upward swinging movement of the scoop and boom, said chute will lift this material and deliver it to the forward end of the elevating conveyer 15, which is spaced above the rear end of the boom 14.

It may also be seen that the curved discharge end of said chute directs the material onto the conveyer in the direction of travel of the conveyer and at an angle with respect thereto, which is relatively flat and thus retards the force with which the material is discharged onto the conveyer.

In the modified form of the invention shown in Figures 3 and 4, the same part numbers will be applied as were applied to similar parts in Figures 1 and 2. In these figures a boom 54 is shown as being transversely pivoted on a hinge member 55 by means of a pivotal pin 56. Said hinge member is pivotally mounted on the main frame 10 adjacent the forward end thereof on a vertical pivotal pin 57, which pin is disposed forwardly of the pin 56. The conveyer 15 is so arranged that its receiving end is disposed beneath but adjacent the hinge member 55 and is shown as being of a standard form such as is usually used in mucking machines of the type disclosed in the aforementioned Mosier patent.

The boom 54 is provided with a chute 59 which extends therealong. The discharge end of said chute is curved to diverge from said boom and extends beyond the rear end of said boom. Said curved chute thus forms a means to deliver material from the scoop to the conveyer and serves to retard the force with which the material strikes the conveyer by directing the material onto the conveyer in the direction of travel of the conveyer and at an angle with respect thereto which is relatively flat.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiments illustrated, excepting as it may be limited in the appended claims.

I claim:

1. In a mucking machine, a track mounted main frame, an inclined elevating conveyer extending along said frame, a boom transversely pivoted adjacent the forward end of said frame, a scoop pivotally mounted on the end of said boom, said boom having a chute extending therealong for delivering material onto said conveyer, said scoop being adapted to deliver its contents onto said chute, the delivery portion of said chute diverging upwardly from the transverse pivotal axis of said boom, when said boom is in a lowered position, and the delivery end thereof being spaced a substantial distance above the transverse pivotal axis of said boom to discharge material onto said conveyer at a relatively flat angle with respect thereto upon upward swinging movement of said scoop and boom.

2. In a mucking machine, a track mounted main frame, an inclined elevating conveyer extending along said frame, a boom transversely pivoted adjacent the forward end of said frame, a scoop pivotally mounted on the end of said boom, said boom having a chute extending therealong for delivering material onto said conveyer, said scoop being adapted to deliver its contents onto said chute, the delivery portion of said chute being curved to diverge upwardly from the transverse pivotal axis of said boom, when said boom is in a lowered position, and the delivery end thereof being spaced a substantial distance above the transverse pivotal axis of said boom, to discharge material onto said conveyer at a relatively flat angle with respect thereto upon upward swinging movement of said scoop and boom.

3. In a mucking machine, a track mounted main frame, a boom transversely pivoted adjacent the forward end of said main frame, a scoop pivotally mounted on the end of said boom, an inclined elevating conveyer having a receiving end disposed directly above the pivotal axis of said boom, and a chute having a receiving end communicating with said scoop and a delivery end spaced a substantial distance above the transverse pivotal axis of said boom to permit said chute to lift and deliver material above the pivotal axis of said boom onto said conveyer upon upward swinging movement of said scoop and boom.

4. In a mucking machine, a track mounted main frame, a boom transversely pivoted adjacent the forward end of said main frame, a scoop pivotally mounted on the end of said boom, an inclined elevating conveyer having a receiving end disposed directly above the pivotal axis of said boom, and a chute having a receiving end communicating with said scoop and having a delivery portion curved to diverge upwardly from said boom when said scoop and boom are in a lowermost position, to space the delivery end of said chute a substantial distance above the pivotal axis of said boom, to permit said chute to lift and deliver material above the pivotal axis of said boom onto said conveyer, in the direction of travel of said conveyer and at a relatively flat angle with respect thereto, upon upward swinging movement of said scoop and boom.

5. In a mucking machine, a main frame, a boom transversely pivoted adjacent the forward end of said main frame, a scoop pivotally mounted on the end of said boom, an inclined elevating conveyer having a receiving end disposed directly above the pivotal axis of said boom, and a chute pivotally mounted on said boom rearwardly of said scoop and adapted to deliver material from said scoop onto said conveyer, the discharge portion of said chute being curved to diverge from said boom, to space the delivery end of said chute a substantial distance above the pivotal axis of said boom, to permit said chute to lift material above the pivotal axis of said boom onto said conveyer in the direction of travel of said conveyer at a relatively flat angle with respect thereto, upon upward swinging movement of said scoop and boom.

6. In a mucking machine, a main frame, a boom transversely pivoted adjacent the forward end of said main frame, a scoop pivotally mounted on the end of said boom, an inclined elevating conveyer having a receiving end disposed directly above the pivotal axis of said boom, and a chute pivotally mounted on said boom rearwardly of said scoop and adapted to deliver material from said scoop onto said conveyer, the discharge portion of said chute being curved to diverge from said boom, to space the delivery end of said chute a substantial distance above the pivotal axis of said boom, and a controlling connection between said scoop and chute to control pivotal movement of said chute in such a manner as to permit said chute to lift material above the pivotal axis of said boom onto said conveyer in the direction of travel of said conveyer at a relatively flat angle with respect thereto, upon upward swinging movement of said scoop and boom.

7. In a mucking machine, a main frame mounted on track wheels and axles, an inclined elevating conveyer extending along said frame, a boom pivotally mounted on the forward end of said frame, a scoop pivotally mounted on the end of said boom, and a chute transversely pivoted on said boom, said scoop being adapted to deliver its contents on said chute, and said chute having a delivery end which is inclined upwardly away from said boom, when said boom is in a lowered position, to discharge material onto said conveyer in the direction of travel of said conveyer and at a relatively flat angle with respect thereto upon upward swinging movement of said scoop and boom, and means for controlling pivotal movement of said chute with respect to said scoop and boom.

8. In a mucking machine, a main frame mounted on track wheels and axles, a conveyer extending along said frame, a boom pivotally mounted on the forward end of said frame, a scoop pivotally mounted on the end of said boom, and a chute transversely pivoted on said boom, said scoop being adapted to deliver its contents on said chute, said chute having a delivery end which is inclined to diverge from said boom, and means extending from said chute adapted to be engaged by said scoop to hold the discharge end of said chute in an upwardly inclined position with respect to said boom during the initial portion of upward movement of said scoop and boom to a discharge position.

9. In a mucking machine, a main frame mounted on track wheels and axles, a conveyer extending along said frame, a boom pivotally mounted on the forward end of said frame, a scoop pivotally mounted on the end of said boom, and a chute transversely pivoted on said boom, said scoop being adapted to deliver its contents onto said chute, said chute having a curved delivery end which diverges from said boom, and means for pivotally moving the discharge end of said chute in an upward direction during the initial portion of the upward movement of said scoop and boom to a discharge position including a central member extending from said chute towards said scoop and adapted to be engaged thereby during lifting movement of said scoop and boom.

10. In a mucking machine, a main frame mounted on track wheels and axles, a conveyer extending along said frame, a boom pivotally mounted on the forward end of said frame, a scoop pivotally mounted on the end of said boom, and a chute transversely pivoted on said boom and having a curved delivery end which diverges from said boom, said chute being adapted to deliver material from said scoop onto said conveyer, flexible means secured to said scoop for pivoting said scoop in an upward direction and then pivoting said scoop and boom to a discharge position, said chute having a curved delivery end which diverges from said boom, and controlling means on said chute projecting beyond the forward end thereof adapted to be engaged by said scoop during lifting movement of said scoop and boom for pivotally moving the delivery end of said chute in an upward direction to prevent spillage of material from said chute during upward movement of said scoop and boom.

11. In a mucking machine, a main frame mounted on track wheels and axles, a swingable boom projecting forwardly from said frame, a scoop pivotally mounted on the end of said boom and adapted to dig by bodily movement of the machine along the track, a pair of flexible members attached to opposite sides of said scoop for adjustably swinging said scoop and boom from side to side and pivoting said scoop and boom in an upward direction to a discharge position, a member disposed beneath a horizontal plane intersecting the uppermost extremities of the track wheels and mounted adjacent the forward end of said frame for pivotal movement with respect thereto about a vertical axis, said member having said boom pivotally mounted thereon for movement about a horizontal transverse axis disposed forwardly of said vertical axis, an inclined elevating conveyer disposed directly above said member and extending rearwardly therefrom along said frame, and a chute mounted on said boom having a receiving end communicating with said scoop and a discharge end spaced from said boom a substantial distance and adapted to elevate and deliver material from said scoop onto said conveyer upon upward swinging movement of said scoop and boom.

12. In a mucking machine, a main frame mounted on track wheels and axles, a swingable boom projecting forwardly from said main frame, a scoop pivotally mounted on the end of said boom and adapted to dig by bodily movement of the machine along the track, a pair of flexible members secured to opposite sides of said scoop for adjustably swinging said scoop and boom from side to side and pivoting said scoop and boom in an upward direction to a discharge position, said boom being mounted on the forward end of said frame adjacent its rear end for pivotal movement about a horizontal transverse axis and about a vertical axis disposed rearwardly of said horizontal transverse axis, a conveyer extending rearwardly along said frame and having a receiving end disposed above the rear end of said boom, a chute pivotally mounted on said boom rearwardly of said scoop and adapted to deliver material from said scoop to said conveyer, said chute diverging from said boom and including a discharge end spaced a substantial distance from the rear portion of said boom to permit said chute to lift material above the pivotal axis of said boom and deliver it onto said conveyer in the direction of travel of said conveyer and at a relatively flat angle with respect thereto when said scoop and boom are in an upwardly extended position with respect to said conveyer.

13. In a mucking machine, a main frame mounted on track wheels and axles, a swingable boom projecting forwardly from said main frame, a scoop pivotally mounted on the end of said boom and adapted to dig by bodily movement of the machine along the track, a pair of flexible members having connection with said scoop for adjustably swinging said scoop and boom from side to side and for pivoting said scoop and boom upwardly to a discharge position, said boom being mounted on the forward end of said main frame adjacent its rear end for pivotal movement about a horizontal transverse axis, and about a vertical axis disposed rearwardly of said horizontal transverse axis, a conveyer extending rearwardly along said frame and having a receiving end disposed above the rear end of said boom, a chute pivotally mounted on said boom rearwardly of said scoop and adapted to deliver material from said scoop to said conveyer, the discharge portion of said chute being curved to diverge from said boom to space the discharge end of said chute from said boom a substantial distance and permit said chute to lift material up to said conveyer and deliver it onto said conveyer in the direction of travel of said conveyer and at a relatively flat angle with respect thereto upon upward swinging movement of said scoop and boom.

14. In a mucking machine, a main frame mounted on track wheels and axles, a boom projecting forwardly from said frame, a scoop pivotally mounted on the end of said boom and adapted to dig by bodily movement of the machine along the track, a hinge member pivotally mounted on said frame, adjacent the forward end thereof, for movement about a vertical axis, said hinge member being disposed beneath a horizontal plane intersecting the track wheels, a transverse pivotal connection between said boom and said hinge member disposed forwardly of said vertical axis, an inclined conveyer extending rearwardly along said frame and having a receiving end disposed directly above said hinge member, a chute disposed rearwardly of said scoop and pivotally mounted on said boom, said chute having a discharge portion which diverges from said boom to space the discharge end of said chute from said boom a substantial distance and which is arranged so upward swinging movement of said scoop and boom may elevate the discharge end of said chute above said conveyer to elevate and deliver material onto said conveyer in the direction of travel of said conveyer and at a relatively flat angle with respect thereto when said scoop and boom are in an upwardly pivoted position with respect to said conveyer.

15. In a mucking machine, a main frame mounted on track wheels and axles, a boom projecting forwardly from said main frame, a scoop pivotally mounted on the end of said boom and adapted to dig by bodily movement of the machine along the track, a hinge member pivotally mounted on said frame, adjacent the forward end thereof, for movement about a vertical axis, said hinge member being disposed beneath a horizontal plane intersecting said track wheels and having said boom mounted thereon for pivotal movement about a horizontal transverse axis disposed forwardly of said vertical axis, an inclined conveyer extending rearwardly along said frame from a point disposed above said hinge member, a chute pivotally mounted on said boom rearwardly of said scoop and adapted to deliver material from said scoop to said conveyer, said chute having a discharge end which is curved to diverge from said boom, and control means projecting from said chute and adapted to be engaged by said scoop during lifting movement of said scoop and boom for pivotally moving the discharge end of said scoop in an upward direction during the initial portion of the upward movement of said scoop and boom to permit said chute to lift material and deliver it onto said conveyer.

ANTHONY R. BIEDESS.